(12) United States Patent
Dunko et al.

(10) Patent No.: US 9,110,538 B2
(45) Date of Patent: Aug. 18, 2015

(54) DEVICES WITH HIDDEN OBJECTS POSITIONED IN FRONT OF DISPLAYS AND RELATED METHODS

(75) Inventors: Gregory A. Dunko, Cary, NC (US); Shruthi Soora, Raleigh, NC (US)

(73) Assignee: HTC CORPORATION, Taoyuan County, Taoyuan (TW)

( * ) Notice: Subject to any disclaimer, the term of this patent is extended or adjusted under 35 U.S.C. 154(b) by 707 days.

(21) Appl. No.: 13/543,937

(22) Filed: Jul. 9, 2012

(65) Prior Publication Data

US 2013/0063823 A1    Mar. 14, 2013

Related U.S. Application Data

(60) Provisional application No. 61/534,715, filed on Sep. 14, 2011.

(51) Int. Cl.
*G06F 3/042* (2006.01)
*G02B 3/00* (2006.01)
*G06F 3/041* (2006.01)

(52) U.S. Cl.
CPC .............. *G06F 3/042* (2013.01); *G02B 3/0056* (2013.01); *G06F 3/0416* (2013.01); *G09G 2320/0261* (2013.01); *G09G 2340/04* (2013.01); *G09G 2354/00* (2013.01)

(58) Field of Classification Search
None
See application file for complete search history.

(56) References Cited

U.S. PATENT DOCUMENTS 6,825,898 B2 * 11/2004 Kobayashi et al. ............. 349/95

| | | |
|---|---|---|
| 6,858,791 B2 | 2/2005 | Erban |
| 7,825,891 B2 | 11/2010 | Yao et al. |
| 8,130,440 B2 | 3/2012 | Kothari et al. |
| 2008/0024870 A1 | 1/2008 | Bourdelais et al. |
| 2009/0316083 A1* | 12/2009 | Kishioka et al. ............. 349/95 |
| 2010/0013795 A1 | 1/2010 | Okino |
| 2010/0284055 A1 | 11/2010 | Kothari et al. |
| 2011/0241983 A1 | 10/2011 | Chang |
| 2012/0120081 A1 | 5/2012 | Bita et al. |

FOREIGN PATENT DOCUMENTS

| | | |
|---|---|---|
| CN | 201285541 Y | 8/2009 |
| CN | 101828146 A | 9/2010 |
| TW | M243670 | 9/2004 |
| TW | 200602754 A | 1/2006 |

(Continued)

OTHER PUBLICATIONS

Taiwan Office Action dated Sep. 10, 2014.

(Continued)

*Primary Examiner* — Derek S Chapel
(74) *Attorney, Agent, or Firm* — McClure, Qualey & Rodack, LLP

(57) ABSTRACT

A representative device includes: a display having a display side, the display being operative to display images at the display side; a light-distorting film having surface features positioned to redirect light; a first object, positioned between the display side and the light-distorting film; and a second object, positioned between the display side and the light-distorting film; a first plurality of the surface features of the light-distorting film being operative to redirect light, propagating along an first optical path; and a second plurality of the surface features of the light-distorting film being operative to redirect light, propagating along a second optical path.

20 Claims, 4 Drawing Sheets

(56) References Cited

FOREIGN PATENT DOCUMENTS

| | | |
|---|---|---|
| TW | 200815855 A | 4/2008 |
| TW | M345293 U | 11/2008 |
| TW | 201135688 A | 10/2011 |
| TW | 201234584 A | 8/2012 |

OTHER PUBLICATIONS

English translation of abstract of TW M345293 (published Nov. 21, 2008).
Taiwan Office Action dated Dec. 26, 2014.
China Office Action dated Jan. 21, 2015.
Taiwan Office Action dated Apr. 15, 2014.

* cited by examiner

DEVICES WITH HIDDEN OBJECTS POSITIONED IN FRONT OF DISPLAYS AND RELATED METHODS

CROSS-REFERENCE TO RELATED APPLICATIONS

This application is a utility application that claims priority to U.S. Provisional Patent Application entitled, "Photovoltaic Film Application", having Ser. No. 61/534,715, filed Sep. 15, 2011, which is entirely incorporated herein by reference.

TECHNICAL FIELD

The present disclosure generally relates to displays.

BACKGROUND

Over the years, portable handheld devices such as smartphones have become prevalent. Typically, there is a trend toward incorporating large displays with narrow borders in these devices for presenting images to users. Unfortunately, use of a large display can negatively impact the engineering of the device. For instance, real estate occupied by the display is often considered unusable for placement of other components because these other components could disturb the viewable areas of the display.

SUMMARY

Devices with hidden objects positioned in front of displays and related methods are provided. Briefly described, one embodiment, among others, is an electronic device comprising: a display having a display side, the display being operative to display images at the display side; a light-distorting film having surface features positioned to redirect light; a first object, positioned between the display side and the light-distorting film, extending in a first direction; and a second object, positioned between the display side and the light-distorting film, extending in a second direction, different from the first direction; a first plurality of the surface features of the light-distorting film being operative to redirect light, propagating along a first optical path, away from the first object such that the first object is not viewable to a user of the device from within at least a first range of viewing angles; a second plurality of the surface features of the light-distorting film being operative to redirect light, propagating along a second optical path, away from the second object such that the second object is not viewable to a user of the device within at least a second range of viewing angles.

Another embodiment is a method for hiding an object from view comprising: providing an electronic device with a display, a first object and a second object, the display being operative to display images, the first object and the second object being positioned in front of the display, the first object extending in a first direction, the second object extending in a second direction, different from the first direction; redirecting light, propagating along a first optical path, away from the first object such that the first object is not viewable to a user of the display from within at least a first range of viewing angles; and redirecting light, propagating along a second optical path, away from the second object such that the second object is not viewable to a user of the display within at least a second range of viewing angles.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
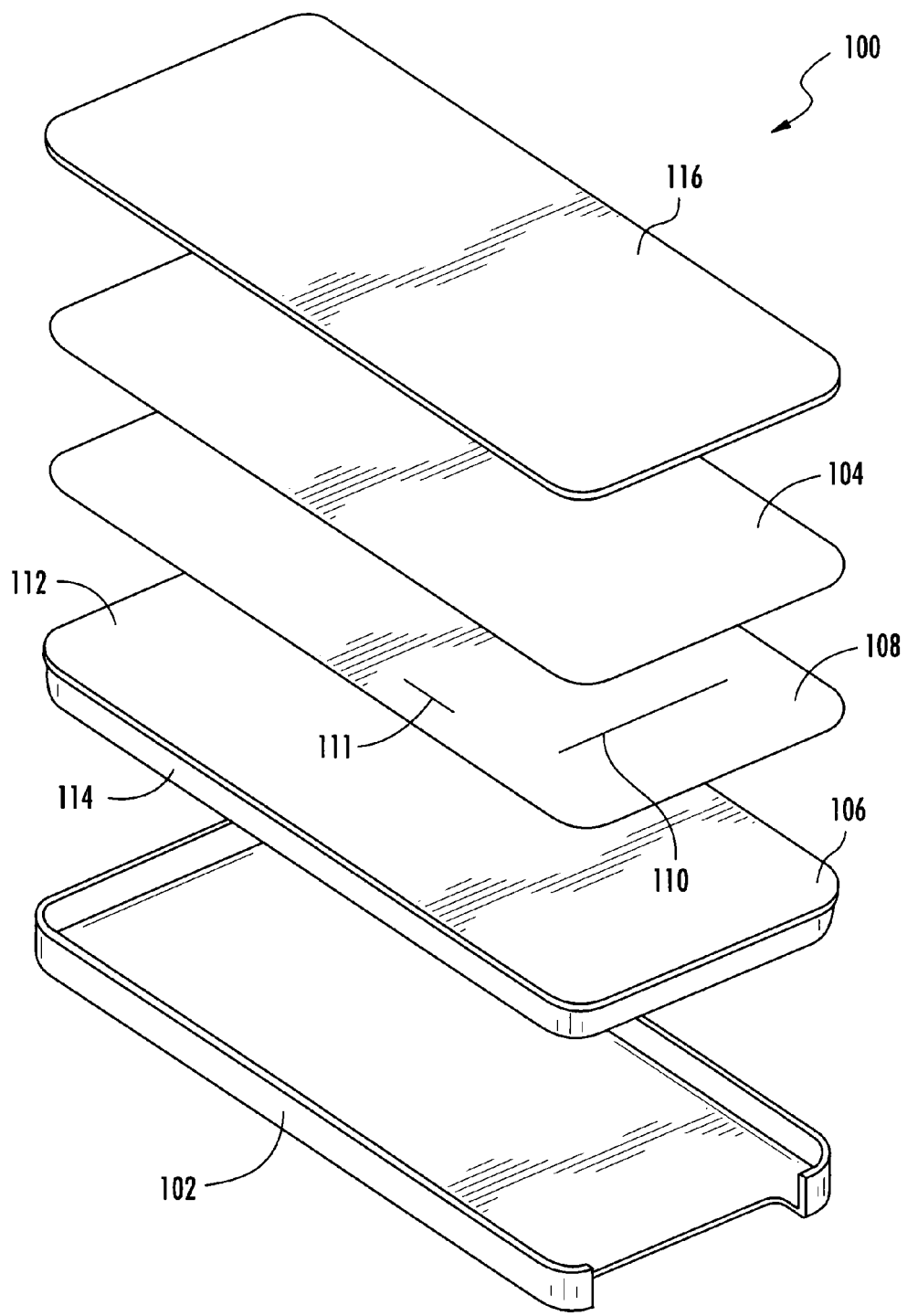
FIG. 1 is a partially-exploded, schematic view of an example embodiment of an electronic device.

Having summarized various aspects of the present disclosure, reference will now be made in detail to that which is illustrated in the drawings. While the disclosure will be described in connection with these drawings, there is no intent to limit the scope of legal protection to the embodiments disclosed herein. Rather, the intent is to cover all alternatives, modifications and equivalents included within the spirit and scope of the disclosure as defined by the appended claims.

Devices with hidden objects positioned in front of displays and related methods are provided. In some embodiments, a hidden object may be opaque (e.g., an electrical trace) and positioned in front of a viewable portion of the display of a device, such as a mobile device. Clearly, without further provisioning, the object would likely be visible to a viewer of the display. However, a light-distorting film is placed above the object to redirect light away from the object so that the object is not visible to the viewer, at least when viewed within a range of viewing angles. In some embodiments, the light-distorting film includes surface features that redirect the light. By using such a technique, objects may be placed in front of the viewable area of a display without negatively impacting on the viewing experience of the user.

In this regard, FIG. 1 is a partially-exploded, schematic view of an example embodiment of an electronic device. As shown in FIG. 1, device 100 is configured as a mobile phone that incorporates a housing 102, a cover 104 and a display 106. A component 108 is positioned above the display. In this embodiment, component 108 incorporates opaque objects; specifically, electrical traces (e.g., electrical traces 110, 111), two of which are depicted in FIG. 1. Note that the traces extend in different directions.

The housing and cover define an interior in which various other components of the device (some of which are not depicted) are located. The display (e.g., a liquid crystal display) includes a display side 112 and a backlight module 114, which provides a source of emitted light for the display. Note that, in other embodiments, various other architectures may be used.

Also included in this embodiment is a light-distorting film 116 positioned above the cover. Specifically, the light-distorting film is positioned in an overlying relationship with at least a portion of the display (in this case, the entire viewable area of the display) and of component 108. The light-distorting film is configured to redirect light away from the electrical traces so that the traces are not visible to the viewer. In some embodiments, the film thickness is on the order of approximately 0.1-0.5 mm. Note that WYSIPS of France manufactures a film that is capable of hiding objects that extend in one direction.

It should be noted that devices may incorporate objects of various configurations that may be hidden from view, such as by using films with surface features and/or variations in refractive index. These various configurations implement the rules of total internal reflection of a light wave. As such, many shapes of surface features may be used provided that light is reflected back to the viewer in a manner that hides an underlying object within at least a range of viewing angles (e.g., within 60 degrees of normal to the display side). In some embodiments, an object may be at least partially visible when viewed from outside the range of viewing angles.

Figure 2:
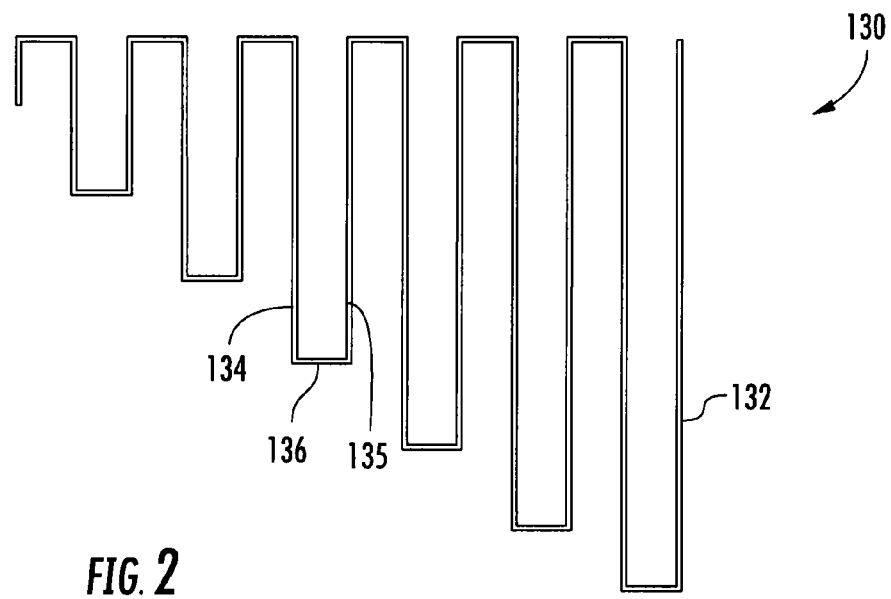
FIG. 2 is a plan view of an example embodiment of an antenna.

FIG. 2 is a plan view of an example embodiment of an antenna that may be incorporated into a device. In this embodiment, the device is a mobile device and antenna 130 includes a strip or trace 132. Notably, portions of the trace (e.g., a first object or portion 134) are oriented parallel to a first direction and other portions (e.g., a second object or portion 136) are oriented perpendicular to the first direction.

Figure 3:
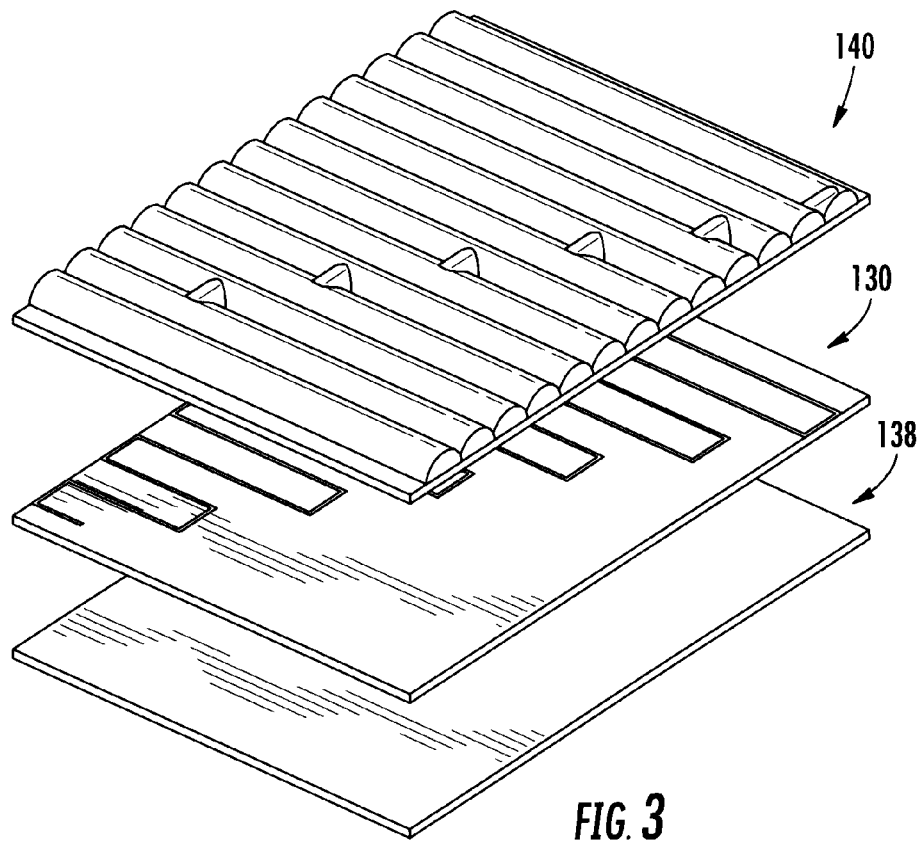
FIG. 3 is a partially-exploded, schematic view of corresponding portions of another example embodiment, showing detail of the display, antenna and light-distorting film.

In FIG. 3, the antenna is shown with a display 138 and a light-distorting film 140. Specifically, the antenna is positioned between the display and the film so that surface features of the film may prevent the antenna from being visible to a user viewing the display. Details of the surface features of this embodiment are described with reference to FIGS. 4-6, in which FIG. 4 is a plan view of the light-distorting film, and FIGS. 5 and 6 depict various cross-sectional views.

Figure 4:
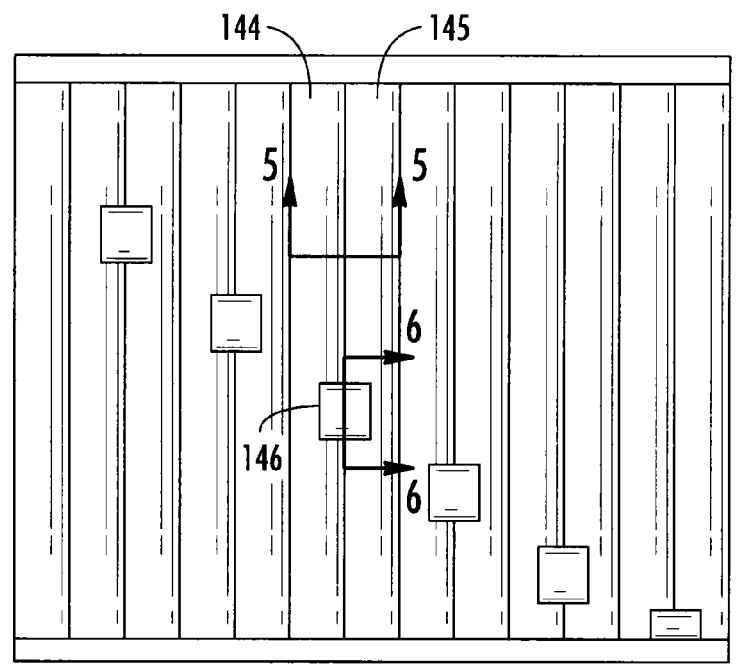
FIG. 4 is a plan view of the light-distorting film of FIG. 3.

In FIG. 4, it is shown that the surface features include major features (e.g., feature 144) that are generally elongate and extend across the film, and minor features (e.g., feature 146) that generally extend between adjacent major features. By providing various combinations of major and minor features, various configurations of objects may be accommodated so that visibility of the objects to a user of the device is reduced.

Figure 5:
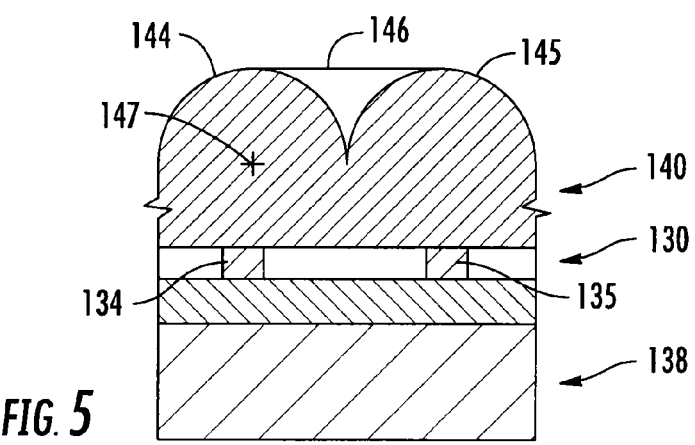
FIG. 5 is a cross-sectional view of the embodiment of FIG. 4, taken along line 5-5.

As shown in FIG. 5, the surface features of the film are configured to align with corresponding portions of the antenna. By way of example, features 144, 145 are aligned and in overlying relationships with portions 134, 135 of the antenna, respectively. Each of the surface features of this embodiment exhibits a generally hemispherical cross-section, with each of the surface features having its center generally aligned above a corresponding portion of the trace. For instance, center 147 of feature 144 is positioned above portion 134. In other embodiments, however, other orientations of objects and surface features may be used.

Figure 6:
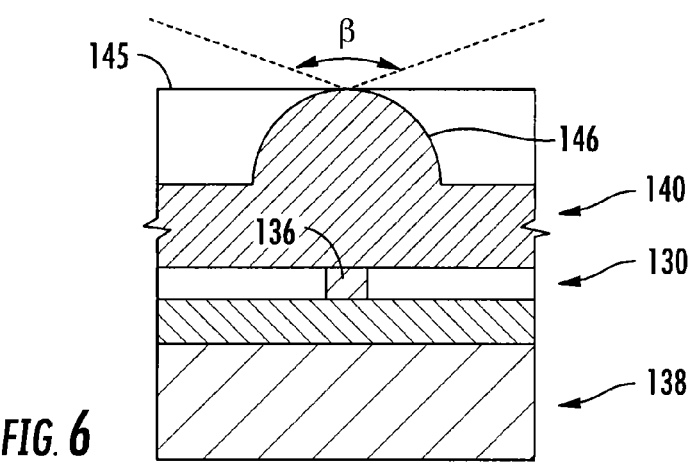
FIG. 6 is a cross-sectional view of the embodiment of FIG. 4, taken along line 6-6.

Additionally, as shown in FIG. 6, feature 146 is aligned and in an overlying relationship with portion 136 of the antenna. So configured, a viewer viewing the display from within the range of viewing angles (β) will be unable to see the object 136. Note that the range of viewing angles associated with feature 146 may be the same as or different from the ranges of viewing angles of other features.

It should be noted that in other embodiments, objects such as traces may be oriented in any planar direction relative to the display. Correspondingly, the surface features of the film may be oriented in any direction.

As shown in the example embodiments, methods for hiding an object from view are provided in which light is redirected away from the object. Notably, the object is positioned in front of a display and would otherwise be viewable by a user of a device that incorporates the display. By incorporating provisions for redirecting the light away from the object, the viewable area of a display may be used for the placement of such objects.

Figure 7:
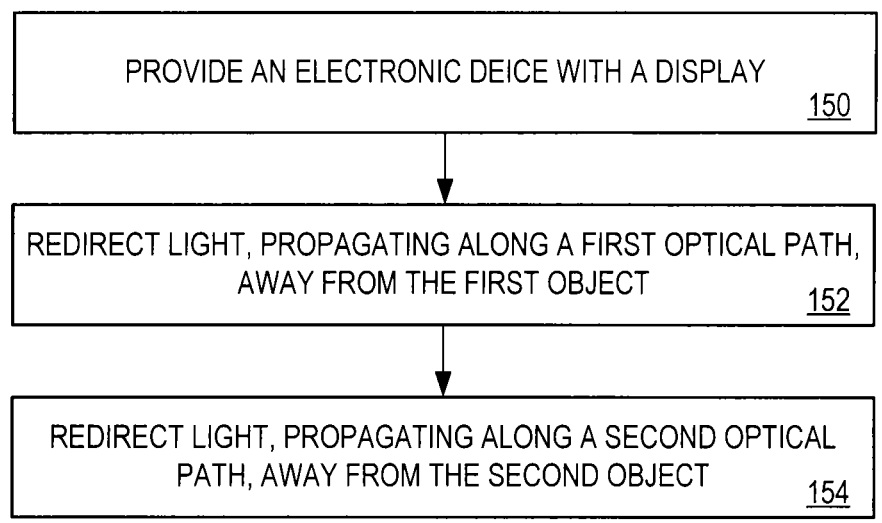
FIG. 7 is a flowchart depicting an example embodiment of a method for hiding objects positioned in front of displays.

In this regard, FIG. 7 is a flowchart depicting an example embodiment of a method for hiding objects positioned in front of displays. As shown in FIG. 7, the method may be construed as beginning at block 150, in which an electronic device with a display is provided. The device also incorporates a first object and a second object, with the objects being positioned in front of the display. Notably, the first object extends in a first direction, and the second object extends in a second direction that is different from the first direction (e.g., the directions may be perpendicular). In some embodiments, the objects may be electrical traces, for example.

In block 152, light propagating along a first optical path is redirected away from the first object. As such, the first object is not viewable to a user of the display from within at least a first range of viewing angles. In block 154, light propagating along a second optical path is redirected away from the second object such that the second object is not viewable to a user of the display within at least a second range of viewing angles. In some embodiments, the redirecting of light is performed by a light-distorting film that incorporates surface features positioned to redirect the light. In such an embodiment, the redirecting of light for hiding of the first and second objects may be performed by the same component (i.e., the light distorting film).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An electronic device comprising:
 a display having a display side, the display being operative to display images at the display side;
 a light-distorting film having surface features positioned to redirect light;
 a first object, positioned between the display side and the light-distorting film, extending in a first direction; and
 a second object, positioned between the display side and the light-distorting film, extending in a second direction, different from the first direction;
 a first plurality of the surface features of the light-distorting film being operative to redirect light, propagating along a first optical path, away from the first object such that the first object is not viewable to a user of the device from within at least a first range of viewing angles;
 a second plurality of the surface features of the light-distorting film being operative to redirect light, propagating along a second optical path, away from the second object such that the second object is not viewable to a user of the device within at least a second range of viewing angles.

2. The device of claim 1, wherein the surface features of the first plurality are oriented in parallel rows.

3. The device of claim 2, wherein a first of the surface features of the light-distorting film exhibits a generally hemispherical cross-section.

4. The device of claim 1, wherein:
the first object is a first portion of an electrical trace; and
the second object is a second portion of the electrical trace.

5. The device of claim 1, wherein the second direction is perpendicular to the first direction.

6. The device of claim 1, wherein:
the light-distorting film has a bottom surface facing the display and a top surface facing away from the display; and
the top surface exhibits contours of the surface features.

7. The device of claim 1, wherein the light-distorting film and the surface features are transparent.

8. The device of claim 1, further comprising a cover positioned between the display and the light-distorting film.

9. The device of claim 1, wherein the first object and the second object are opaque.

10. The device of claim 9, wherein the first object and the second object form at least a portion of an antenna operative to propagate signals of the device.

11. The device of claim 1, wherein the device is a smartphone.

12. The device of claim 1, wherein the surface features of the first plurality are elongate.

13. The device of claim 12, wherein the surface features of the second plurality extend between corresponding adjacent ones of the surface features of the first plurality.

14. The device of claim 1, wherein the first range of viewing angles and the second range of viewing angles exhibit equivalent ranges.

15. The device of claim 1, wherein the first range of viewing angles and the second range of viewing angles exhibit different ranges.

16. The device of claim 1, wherein the first object extends across the display side of the display.

17. The device of claim 1, wherein the first object is only partially visible when viewed from outside the first range of viewing angles.

18. A method for hiding an object from view comprising:
providing an electronic device with a display, a first object and a second object, the display being operative to display images, the first object and the second object being positioned in front of the display, the first object extending in a first direction, the second object extending in a second direction, different from the first direction;
redirecting light, propagating along a first optical path, away from the first object such that the first object is not viewable to a user of the display from within at least a first range of viewing angles; and
redirecting light, propagating along a second optical path, away from the second object such that the second object is not viewable to a user of the display within at least a second range of viewing angles.

19. The method of claim 18, wherein redirecting the light away from the first object comprises using a light-distorting film having surface features positioned to redirect the light.

20. The method of claim 19, wherein redirecting the light away from the second object comprises using the light-distorting film.

\* \* \* \* \*